United States Patent [19]

Sokolow et al.

[11] Patent Number: 4,947,315
[45] Date of Patent: Aug. 7, 1990

[54] SYSTEM FOR CONTROLLING INSTRUMENT USING A LEVELS DATA STRUCTURE AND CONCURRENTLY RUNNING COMPILER TASK AND OPERATOR TASK

[75] Inventors: Stephen A. Sokolow, Menlo Park; Urs Steiner; John R. Lewis, both of Sunnyvale, all of Calif.

[73] Assignee: Finnigan Corporation, San Jose, Calif.

[21] Appl. No.: 314,282

[22] Filed: Feb. 21, 1989

Related U.S. Application Data

[63] Continuation of Ser. No. 937,355, Dec. 3, 1986, abandoned.

[51] Int. Cl.$^5$ .............................. G06F 9/44; G06F 9/38
[52] U.S. Cl. ................................ 364/200; 364/280.4; 364/281.3; 364/281.4; 364/281.8; 364/191; 364/192
[58] Field of Search ... 364/200 MS File, 900 MS File, 364/300, 188, 191, 192, 193, 194

[56] References Cited

U.S. PATENT DOCUMENTS

| | | | |
|---|---|---|---|
| 3,969,723 | 7/1976 | Kennicott | 364/200 |
| 4,553,205 | 11/1985 | Porchia | 364/300 |
| 4,584,644 | 4/1986 | Larner | 364/200 |
| 4,604,694 | 8/1986 | Hough | 364/200 |
| 4,663,704 | 5/1987 | Jones et al. | 364/191 |
| 4,683,549 | 7/1987 | Takaki | 364/900 |
| 4,700,290 | 10/1987 | Ichikawa | 364/191 |
| 4,716,516 | 12/1987 | DuLong | 364/132 |

*Primary Examiner*—Thomas C. Lee
*Attorney, Agent, or Firm*—Flehr, Hohbach, Test, Albritton & Herbert

[57] ABSTRACT

Method and apparatus for controlling an instrument which can perform a specified cyclic process. The instrument's process is controlled by a computer which has two concurrently defined tasks: an operator task for running an instrument control program, and a compiler task for compiling new instrument control programs input by the instrument's user. The currently running program is suspended and a new program's execution is begun when (a) a new program has been successfully compiled by the compiler, and (b) the current program is about to perform a jump back at the end of an instruction loop. When a main instrument control program finishes executing, a new program is run if a new program has been successfully compiled; otherwise, execution of the most recently suspended program resumes. Thus a newly compiled program interrupts the currently running program only between instruction loops, and only as long as necessary to execute its instructions. If the newly compiled program merely resets a parameter, this interruption is generally so short as to be unnoticeable. If, on the other hand, the newly compiled program is designed to control the instrument's process for a period of time, the new program takes control until it finishes execution. Thus the instrument's user is provided not only with the feel of being able to reset parameter values on the fly, but also with a flexible tool for revising an instrument control program on the fly.

19 Claims, 4 Drawing Sheets

SYSTEM FOR CONTROLLING INSTRUMENT USING A LEVELS DATA STRUCTURE AND CONCURRENTLY RUNNING COMPILER TASK AND OPERATOR TASK

This is a continuation of application Ser. No. 937,355, filed Dec. 3, 1986, now abandoned.

The present invention relates generally to electronic instrumentation controllers, and particularly to computer based controllers for instruments which perform repetitive or cyclic processes.

BACKGROUND OF THE INVENTION

In many instruments, the switches, dials and other physical controls have been replaced by computers. Instead of adjusting the setting on a particular dial to adjust a particular physical parameter, the user of the instrument must now type in a corresponding instruction on the keyboard of the instrument's computer. While the use of computer controls may have many advantages (e.g., the ability to automatically check for parametric inputs which might be injurious to the instrument, the materials affected by the instrument, or the instrument's user), it also has wrought a number of problems.

The primary problem addressed by the present invention is the need to be able to adjust a physical parameter without stopping the processes being performed by the instrument. In the prior art controllers which used dials and the like, this was no problem. You just turned the dial, and this directly produced a physical change. Furthermore, this adjustment usually did not require stopping the process being run by the instrument. One problem with the use of dials and switches which directly controlled physical parameters was that, in some instances, changing a physical parameter in the middle of a process cycle might produce unpredictable results.

In a computer controlled instrument there is generally a software routine, herein called an instrument control program, which controls or oversees the process being run by the instrument. The nature of the instrument's process is typically controlled by parameters supplied either by the software's author or by the instrument's user.

To change one or more of these parameters' value, one must somehow interrupt the use of the instrument's control program. Note that the goal here is to simulate the use of a physical dial or switch as closely as possible. Thus, one would like to be able to "tweak" one or more parameters while the instrument's process continues to run. The result of adjusting the parameter(s) is then observed on the instrument's control panel, or however the results of the process are normally observed.

The main prior art method for changing a parameter value in the middle of running a computer program would be to simply interrupt the control program whenever the instrument's computer detects keyboard input. Virtually every prior art implementation of this solution, however, will cause the instrument control program to be stopped for unacceptably large periods of time.

In instruments such as mass spectrometers which repetitively or cyclically perform a process, the inventors have found that the best time to momentarily interrupt a process to adjust its parameters is between process cycles. A process cycle is typically defined by an instruction loop in an instrument control program. Further, the inventors have found that it is advantageous to use a concurrently running task to compile new user programs, and to then run successfully compiled new user programs between process cycles of the currently running control program. In this way, the newly compiled program interrupts the currently running program as only as long as necessary to execute its instructions. If the newly compiled program merely resets a parameter, this interruption is generally so short as to be unnoticeable. If, on the other hand, the newly compiled program is designed to control the instrument's process for a period of time, the new program takes control until it finishes execution. Thus the present invention provides not only the feel of being able to reset parameter values "on the fly", but also provides a flexible tool for revising a control program "on the fly".

It is therefore a primary object of the present invention to provide an improved instrument control method which allows parametric and other adjustments of a cyclic computer controlled process to be made without having to stop and restart the process.

A primary feature of the present invention is the interruption of the currently running instrument control program with a more recently provided control program, but only when the currently running program is about to perform a jump back at the end of an instruction loop. Newly input control programs are compiled by a separate concurrent task, thereby allowing the entry of new commands and programs without interfering with the running of the currently running control program.

SUMMARY OF THE INVENTION

In summary, the present invention is a method and apparatus for controlling an instrument which can perform a specified cyclic process. The instrument's process is controlled by a computer which has two concurrently defined tasks: an operator task for running an instrument control program, and a compiler task for compiling new instrument control programs input by the instrument's user. The currently running program is suspended and a new program's execution is begun when (a) a new program has been successfully compiled by the compiler, and (b) the current program is about to perform a jump back at the end of an instruction loop. When a main instrument control program finishes executing, a new program is run if a new program has been successfully compiled; otherwise, execution of the most recently suspended program resumes.

Thus a newly compiled program interrupts the currently running program only between instruction loops, and only as long as necessary to execute its instructions. If the newly compiled program merely resets a parameter, this interruption is generally so short as to be unnoticeable. If, on the other hand, the newly compiled program is designed to control the instrument's process for a period of time, the new program takes control until it finishes execution.

By interrupting the currently running program only at the time of a jump back, the present invention preserves the integrity of the instrument's process and provides the instrument's user with the ability to change process parameter values in a similar fashion to adjusting a physical dial which affects the operation of the instrument. In other words, the present invention restores some of the look and feel of physical process control dials to computer controlled instruments.

Subsidiary aspects of the present invention include the ability to prevent the interruption of the currently running instrument control program by setting a priority flag, cancelling the currently running program and resuming execution of the last suspended program when the user inputs a cancel command, and aborting the execution of the currently running program and all suspended program when the user inputs an abort command.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
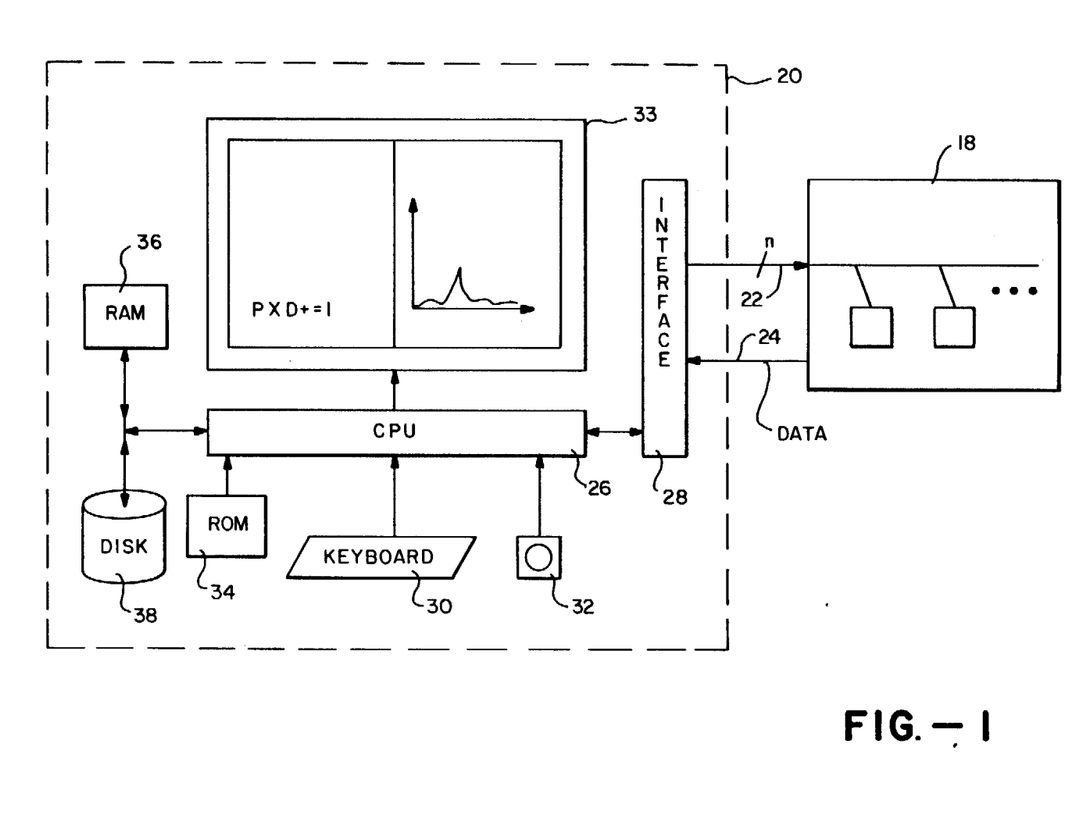
FIG. 1 is a block diagram of an instrument coupled to a computerized controller in accordance with the present invention.

Referring to FIG. 1, there is shown a block diagram of an instrument 18 coupled to a computerized controller 20 in accordance with the present invention. In the preferred embodiment the instrument 18 is a Finnigan Mass Spectrometer, model TSQ 70, and the controller 20 uses an Intel 8086 microprocessor with an Intel 8087 arithmetic coprocessor.

The instrument 18 has a sizable set of user adjustable parameters which affect the instrument's operation. These parameters include voltage levels, processing rates, set points, alarm points (i.e., limit values which, if violated, cause a predefined action to be performed), and so on. In the prior art devices, the user controlled these parameters through a set of dials and switches on a control panel which was a part of the instrument 18.

The controller 20 is coupled to the instrument 18 by a control bus 22 and a data bus 24. The control bus 22 is used to transmit control signals to the instrument, and to thereby change the physical parameters which control the operation of the instrument 18. The data bus 24 is used for sending data generated by the instrument to the controller 20. The data is then displayed, stored, and/or processed in accordance with how the controller is programmed.

The controller 20 includes a central processing unit (CPU), which is coupled to the control and data busses 22 and 24 by an interface 28. A keyboard 30 and a trackball 32 are provided for user input, and a high resolution display 33 is used for displaying both data and user inputs.

The trackball 32 is an input device which includes a spherical ball that can be rotated. As will be described in more detail below, the trackball can be linked to any one of a number of parameters, so that rotating the trackball 32 has the same effect as turning a dial which is directly coupled to a corresponding portion of the instrument 18.

The display 33 is generally divided into two or more windows so that the user can see the data generated by the instrument 18 in one window while performing one of a number of predefined user functions in another window.

The controller's operating system is stored in a read only memory (ROM) 34 to facilitate high speed processing, and the controller 20 also includes random access memory (RAM) 36 and disk memory storage 38.

Data Structures

Figure 2:
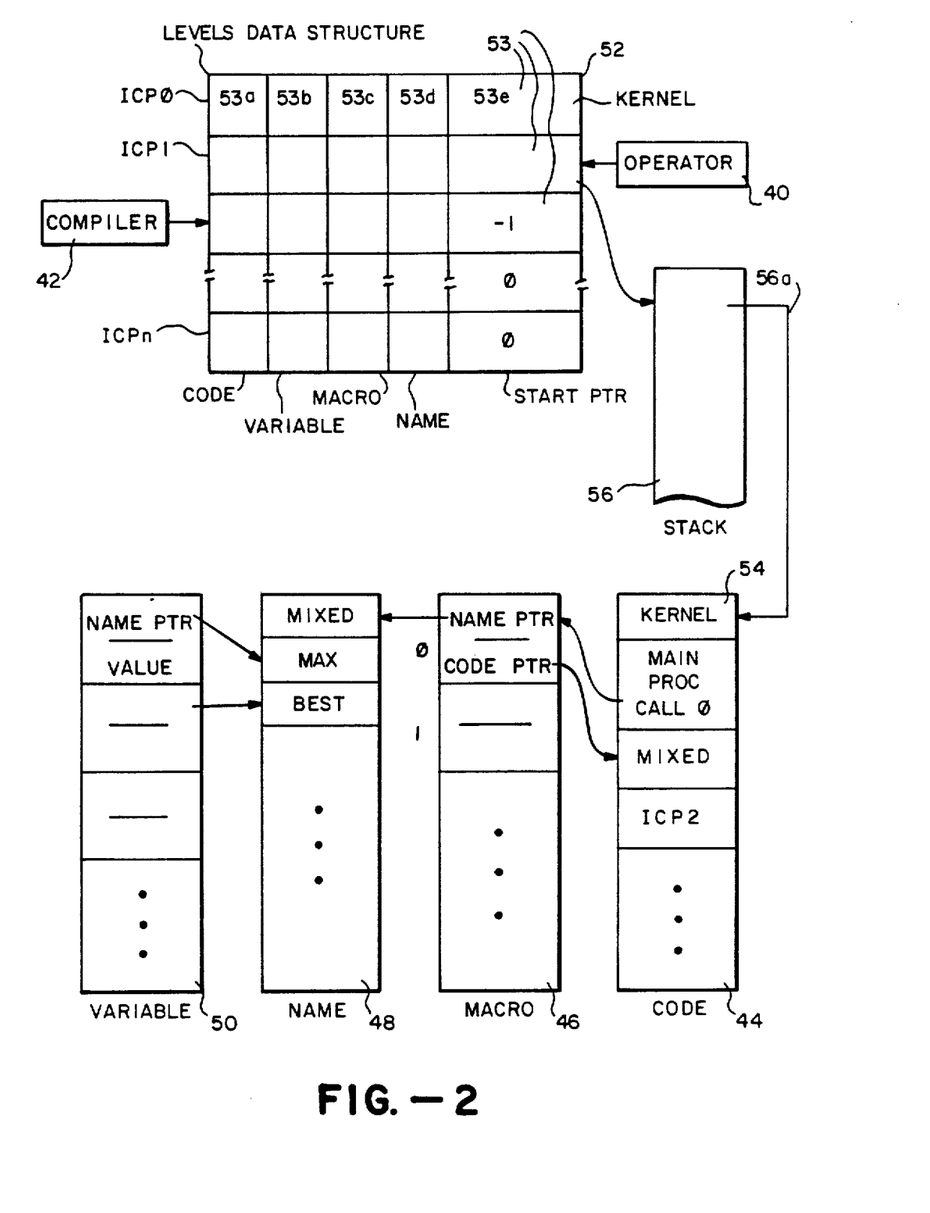
FIGS. 2 and 3 are block diagrams of data structures used in the preferred embodiment of the present invention.

Referring to FIG. 2, the controller 20 has two concurrently running tasks: an operator task 40 for running an instrument control program, and a compiler task 42 for receiving and compiling instrument control programs including new instrument control programs input by the user of the instrument 18. The operator task has higher priority than the compiler so that the operator 40 will not be interrupted by the compiler.

Although not shown in the Figures, in the preferred embodiment there is also a real time clock task, which has the highest priority, to update the system's time and date variables. Also, the display 33 includes a separate processor, not shown in the Figures, which enables the use of a separate display task with graphic display functions that would otherwise overburden the controller's main CPU 26.

The operator and compiler tasks 40 and 42 use a set of data structures, located in the controller's RAM 36, to store instrument control programs and to keep track of the status of each of these control programs. Four arrays 44-50 are used to store compiled programs and related information.

The Code Array 44 is used to store compiled instrument control programs. The Macro Array 46 is used to keep track of all the macros (i.e., named instrument control subroutines) which are stored in the Code Array 44. For each macro, it includes a pointer to the name of each macro and a pointer to the location in the Code Array 44 where the compiled macro is stored. The Name Array 48 is used to store the names of all the macros referenced in the Macro Array 46, and all the variables used in the programs stored in the Code Array. The Variable Array 50 stores a pointer to the name of each variable used and its current value.

An array 52, called the Levels Data Structure, is used as an execution queue for the operator task 40. The slots 53 in the queue are labelled ICP0, ICP1, . . . ICPn. In the preferred embodiment, the top slot ICP0 is always occupied by an instrument control program called the kernel 54. The kernel 54 is simply an instruction loop with a short delay between jumps back to the beginning of the loop. As will be explained in more detail below, the jump back at the end of the kernel's instruction loop provides the hook into the operator task for starting new instrument control programs.

As new instrument control programs are input by the user and compiled by compiler 42, a reference to each new program is added to end of the program list in the Levels Data Structure 52. Whenever an instrument control program finishes execution its reference is deleted from the Levels Data Structure 52. The reference to the kernel program 54 cannot be deleted.

At this point it is important to distinguish between main instrument control programs and subroutines, which are called macros in the preferred embodiment. Main programs are those programs which the user requests the controller 20 to run. Macros are programs which are called, or used, by main programs. Only main programs are referenced in the Levels Data Structure 52. There is generally no other limitation on the length or function of either main programs or macros.

Thus a main program may be a simple, one line program, such as

LENS+ = 1 to increment one of the instrument's parameters. On the other hand, a main program can be a procedure which oversees the operation of the instrument 18 for either a limited or an indefinite period of time.

Another difference between main programs and macros is that macros are stored on the controller's disk 38 whereas main programs are stored only in RAM 36. Thus programs that the user wants to reuse must be stored on disk as macros. When a macro is referenced in a main program, the Compiler 42 fetches and compiles the corresponding code from the disk 38 for use in the compiled main program.

The Levels Data Structure 52 has five entries for each main instrument control program: pointers 53a-53d to the last position in the Code, Variable, Macro and Name arrays 44-50 used by the program, and a start pointer 53e. Before the program is run, the start pointer 53e points to the starting point of the compiled program in the Code array 44; when the program is suspended the start pointer 53e points to the portion of a Stack 56 in memory 36 where the parameters needed to resume execution of the program are stored. The Stack 56 is used in standard fashion, with new parameters being pushed onto the Stack for temporary storage and later being popped off the Stack for retrieval. One of the parameters stored in the Stack 56 for each main control program is a pointer 56a to the first instruction in the Code Array 44 to be executed when the program resumes execution.

The first four pointers 53a-53d for each program slot 53 in the Levels Data Structure 52 are used only by the Compiler 42 to keep track of where to store the next successfully compiled program. When the Compiler 42 compiles a program it uses the array position values 53a-53d in the last occupied slot of Structure 52 to determine where the program is to be stored. When it completes the compilation process, the Compiler stores, in the slot 53 assigned to the compiled program, the starting address of the compiled program in the start pointer 53e and the last position used in each of the four arrays 44-50 in the array pointers 53a-53d.

The Compiler 42 also keeps track of what slots 53 of the Levels Data Structure 52 are occupied by program references and puts a marker (a value of −1) in the start pointer of the first slot below the last occupied slot. When the Operator 40 finishes running a main program, its reference is marked as being done by putting a distinct marker (a value of 0) in the start pointer entry for that program.

Thus, when the Operator 40 looks to see if there are any new programs waiting to run, it merely looks through all the slots of the Levels Data Structure 52 below the slot for the currently running program until (a) it finds a start pointer value greater than zero, or (b) it finds a start pointer equal to −1. The −1 marker stops the Operator's search. If a nonzero start pointer value is found, the Operator 40 uses the start pointer to initiate execution of the corresponding referenced program. Otherwise the Operator 40 will conclude that there are no new programs waiting to run.

When the Operator 40 suspends the operation of one program to begin running another program, the parameters needed to restart the first program are pushed onto the Stack 56, and a pointer to where these parameters are stored on the Stack 56 is put in the start pointer 53e in the slot for the suspended program.

Figure 3:
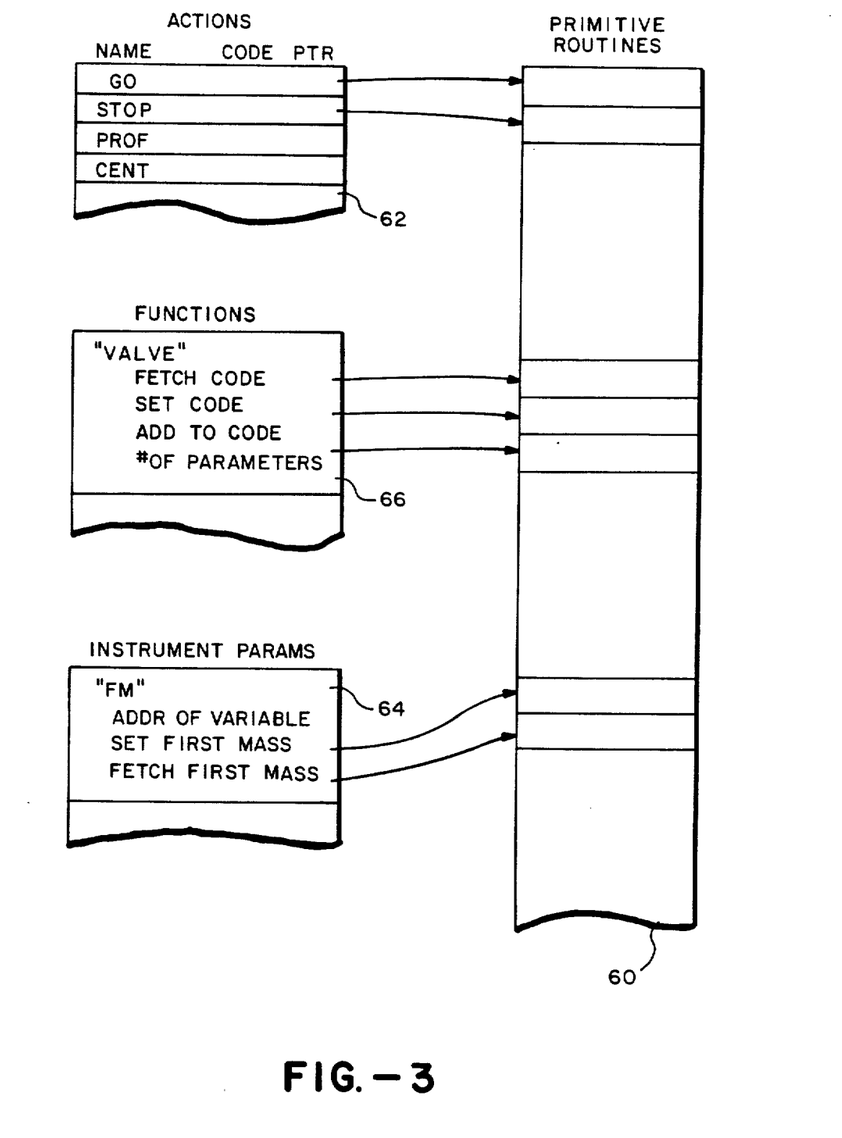

FIG. 3 is a block diagram of data structures used to define the instrument control language, instrument functions, and instrument parameters in the preferred embodiment of the present invention. These data structures are part of the operating system which is stored in the controller's ROM 34.

Primarily, these data structures in FIG. 3 provide the information needed to compile instrument control programs. The Primitive Routines array 60 contains compiled code segments for inclusion in compiled programs. The Actions, Functions, Instrument Parameters and Primitives arrays contain labelled lists of keywords with pointers to the corresponding compiled code.

Actions are instrument processes that may or may not require the specification of any parameters. In the preferred embodiment there are data acquisition actions, instrument tuning actions, instrument start up and shut down actions, diagnostic actions, actions which specify the instrument's mode of operation, and data processing and graphing actions.

Instrument parameters are physical parameters which can be assigned a value. For each parameter there is stored in the Instrument Parameters Array: the name of the parameter, a pointer to a reserved address in RAM 36 where the current value of the parameter is stored, a pointer to the primitive for updating the value of the parameter, and a pointer to the primitive for fetching the value of the parameter.

The user is free to define new parameters for use in a control program, so long as these parameters are given names that do not conflict with any of the names assigned to Actions, Instrument Parameters, and Functions.

Functions are generally routines for processing data. In other words, a number of data processing functions known to be useful for handling the data generated by the instrument 18 are built into the instrument control language. Functions can also be used to store an array of values.

Referring to Table 1, there is shown an example of a instrument control program. The left column shows the source code input by the user, and the right column shows the compiled code produced by the Compiler task 42. The source code has been vertically spaced to align the source code with the corresponding compiled code. In this example, the main instrument control program contains a macro reference to the MIXED macro, and thus the compiled code includes a procedure call to the MIXED macro and also the compiled code for the macro.

Note that compiled main instrument control programs end with a self destruct command—which causes the reference to the program in the Levels Data Structure to be deleted, and causes the Operator to find the next program to be run. Macros, on the other hand, end with a return statement. Also, several main control programs can reference the same macro.

Only the Compiler task actually deletes a program's code from the Code Array 44, along with the related information in arrays 46-50. Whenever the Compiler task stores a newly compiled program in the Code Array 44, the Compiler first finds the lowest active reference in the Levels Data Structure (i.e., it finds the lowest slot with a start pointer that is greater than zero). The Compiler then uses the array pointers from that slot to determine where to start storing the new program. In this way, programs are deleted by being overwritten. In the case of a macro program, it can be seen that by using this procedure the macro's code will be deleted (i.e., overwritten) by the Compiler task when deleting a main program that uses it only if no other main program uses the same macro—because if another main program uses the same macro, the code for the macro will be in the portion of the arrays 44–50 that is not being overwritten.

As will be understood by those skilled in the art, the preferred embodiment is structured so that the present invention can be used with different instruments by redefining the contents of the data structures shown in FIG. 3. Thus each different instrument will require its own set of actions, parameters, and possibly functions, with corresponding primitive routines.

Method of Scheduling Program Changes

Figure 4:
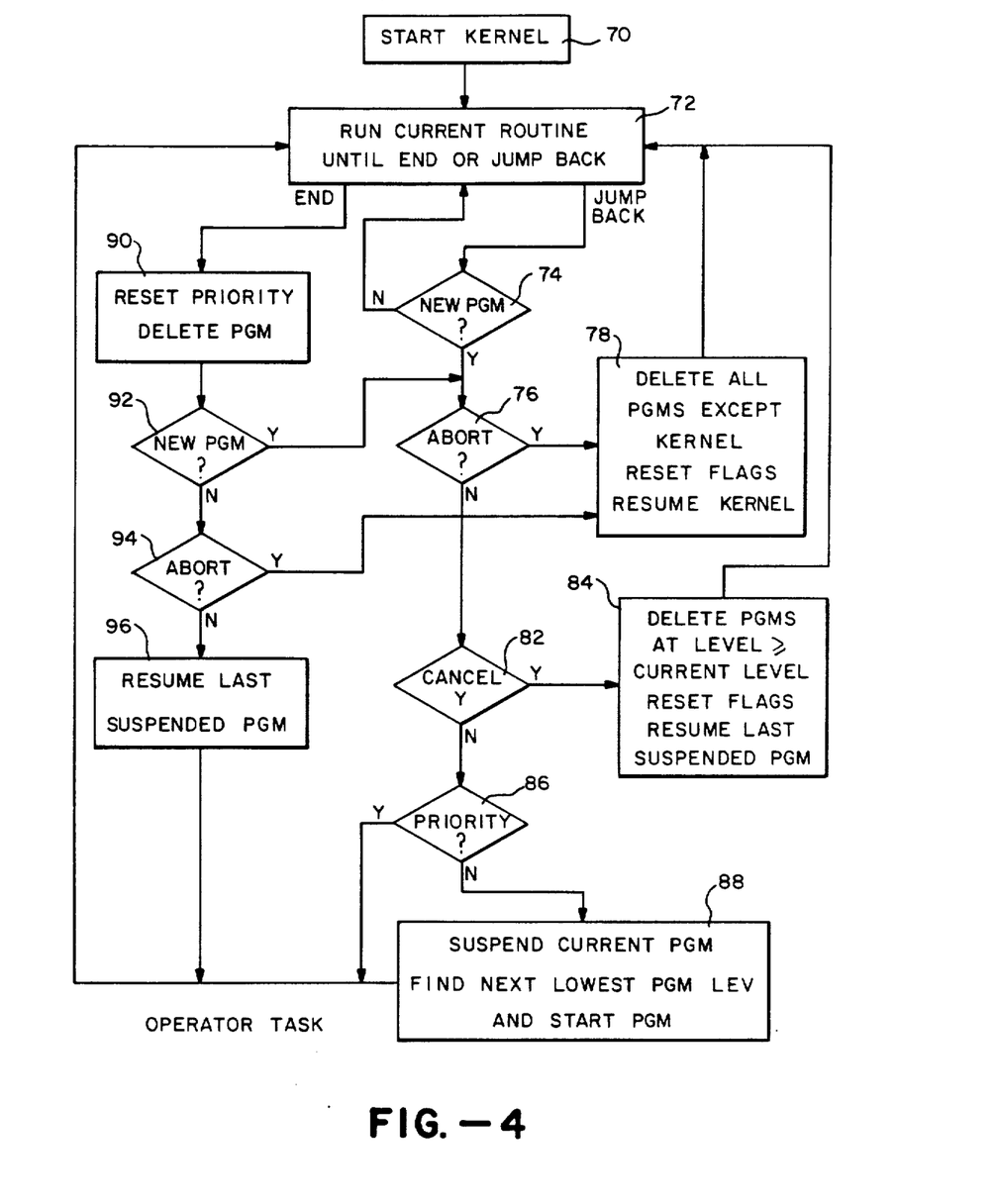
FIG. 4 is a flow chart of the operator task in the preferred embodiment.

FIG. 4 is a flow chart of the Operator task in the preferred embodiment. Before describing this process, however, it is necessary to understand the operation of certain flags use by both the Compiler and the Operator.

An ABORT flag is used to indicate that all of the control programs currently referenced in the Levels Data Structure, except the kernel program, are to be stopped and deleted. The ABORT flag is set by the Compiler when it receives an abort instruction from the user.

Similarly, a CANCEL flag is used to indicate that the currently running program and all subsequently compiled programs are to be deleted. The CANCEL flag is set by the Compiler when it receives a cancel instruction from the user.

Finally, a PRIORITY flag is used to indicate that the currently running program should not be interrupted by subsequently compiled control programs. The PRIORITY flag, unlike the other two flags, is set by the Operator when it encounters a High Priority instruction. The PRIORITY flag is reset if the Operator encounters a Low Priority instruction.

The Operator task tests these flags at certain times, as described below, and responds accordingly.

When the instrument 18 is first turned on or reset, the Operator task 40 begins by starting the kernel program (box 70), which is simply an instruction loop with a small delay, equivalent to the following program:
sleep
0.1 seconds
jump$_{13}$ back
2

The currently running instrument control program is allowed to run uninterrupted until it ends or reaches a "jump back" instruction at the end of an instruction loop (box 72). As defined herein, a jump back instruction is a specific instruction compiled at the end of an instruction loop which causes the program's execution to continue at the beginning of the loop.

When a jump back instruction is reached, if there is no new program waiting to be executed, then the execution of the currently running routine is allowed to continue (box 74). As explained above, the Operator determines if there is a new program waiting to run by searching down through the Levels Data Structure 52, starting with the slot below the slot for the currently running program, to see if there are any start pointers which are greater than zero.

If a new program waiting to run is found, the following procedure is followed. First, the Operator tests the ABORT flag (box 76). If the ABORT flag is set, the Operator task (see box 78) deletes all the programs referenced in the Levels Data Structure, except the kernel, by setting all of the start pointers between the top slot and the compiler's slot (marked with a $-1$ start pointer) to zero. All of the program flags (ABORT, CANCEL, and PRIORITY) are reset (box 80). Then the Operator task resumes running the kernel program using the start pointer in the top slot of Levels 52 to find the next instruction to be executed. The kernel will then idle (boxes 72 and 74) until the user enters a new instrument control program.

If the ABORT flag is not set (box 76), the Operator tests the CANCEL flag (box 82). If this flag is set, the currently running program and all the programs below it in Levels are deleted (see box 84). However, if the currently running program is the kernel, the kernel program reference is not deleted from the Levels Data Structure. Then all the flags are reset and the Operator task resumes running the last suspended control program which—is the lowest program referenced in the Levels Data Structure with a nonzero start pointer.

If the CANCEL flag is not set (box 82), the Operator tests the PRIORITY flag (box 86). If the PRIORITY flag is set, the Operator task resumes running the currently running routine (box 72). If the PRIORITY flag is not set, however, the current program is suspended and execution of the next referenced program in the Levels Data Structure is begun (box 88).

A program is suspended by pushing onto the stack 56 a pointer to the instruction at the top of the instruction loop that was just executed, plus the other parameters needed to resume execution of the program. A pointer to this position in the stack 56 is stored in the start pointer entry 53e for the program in the Levels Data Structure.

When the execution of a program is finished, the program is deleted from the Levels Data Structure 52 by setting its start pointer 53e to zero (box 90). Also, the PRIORITY flag is reset.

If (box 92) there is a control program which was successfully compiled after the program which just ended (i.e., if there is at least one program referenced in the Levels Data Structure at a level below the level of the program which just ended), then the Operator process continues with the test of the ABORT flag (box 76) as described above.

If there is not a more recently compiled control program (box 92), then the Operator checks, the ABORT flag (box 94) before resuming execution of the last suspended program (box 96). If the ABORT flag has been set, the Operator task (see box 78) deletes all the programs referenced in the Levels Data Structure, except the kernel, resets all of the program flags, and resumes running the kernel program.

Trackball Usage

In the preferred embodiment, the Compiler includes an editor for writing new instrument control programs. The user writes and edits the new program, viewing the program's source code on the display 33, in conventional fashion. When the user believes that the program is complete, he instructs the controller to compile the program. When the program is compiled, all the macros referenced by the program which are not already compiled are also compiled at this time. Unknown macros are compiled as null routines which do not affect the system's performance (except for a very brief delay). As will be understood by those skilled in the art, this feature facilitates top down program design. If the program is successfully compiled, it is stored in the code arrays 44-50 and it is referenced in the Levels Data Structure 52. If the program contains errors which prevent it from being compiled, the user is informed of the errors.

There is another method of writing instrument control programs, however, using the trackball 32. In the preferred embodiment the controller includes a mode of operation called "tuning mode". When in tuning mode, the user can specify a parameter which is to be associated with the trackball. (The use of the trackball depends on the controller's current mode of operation, as selected by the user.) Then, whenever the trackball is rotated, the Compiler automatically writes a short program which looks like:

PARAM=X where PARAM is the name of the parameter tied to the trackball, = indicates that PARAM is to be set equal to the value on the right hand side of the equation, and X is a value that is changed in proportion to the amount that the trackball has been rotated. In other words X is assigned the previous value of PARAM, and then when the trackball is rotated, X is increased or decreased, depending on which way the trackball is rotated.

If the user continues to rotate the trackball, a series of short programs will be generated.

The programs generated in this way will be run the next time the currently running control program performs a jump back at the end of an instruction loop.

In practice, this use of the trackball has been found to give the instrument user the feel of using a dial which is directly coupled to a physical element in the instrument. In the preferred embodiment, instruction loops are generally of short duration (typically no longer than a second, although they can last much longer), and thus trackball generated programs are executed quickly.

In the preferred embodiment, the trackball can be rotated both horizontally and vertically. The controller 20 can be operated in a mode called "ICL" in which a system variable called XBALL is changed by horizontal movement of the trackball, and a system variable called YBALL is changed by vertical movement of the trackball. The values of these two variables are increased or decreased in proportion to the amount that the trackball is rotated. Furthermore, there is a command for setting the scale of the trackball, e.g., setting the factor C in the equation $$XBALL = XBALL + (C*\theta)$$

where $\theta$ is the amount that the trackball has been horizontally rotated since the last time XBALL's value was updated.

The user can use the XBALL and YBALL variables by writing a program which includes a statement such as

PARAM=XBALL in an instruction loop so that the named parameter is tied to the rotation of the trackball whenever the controller is in "ICL" mode. When the trackball is used in this way it acts by updating the XBALL and YBALL system variables; it does not cause the generation of new instrument control programs.

The keyboard equivalent to using the trackball is writing a one line program, such as

PARAM+ =0.2 and then using the REPEAT key on the controller's keyboard 30 to repeat use of this program until the value of PARAM has been adjusted to the user's satisfaction.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

| User's Source Code | Compiled Code |
|---|---|
| MAIN ROUTINE: | |
| MAX = 0 | move immediate |
| | address(MAX) |
| | 0 |
| LENS = −200 | push |
| | −200 |
| | action_call |
| | address(set_LENS) |
| REPEAT 400 | push_repeat_count |
| | 400 |
| GO | action_call |
| | adress(GO) |
| STOP | action_call |
| | address(STOP) |
| IF AREA > MAX | action_call |
| | address(AREA) |
| | push |
| | address (MAX) |
| | compare |
| | jump_gt |
| | 7 |
| MAX = AREA | action_call |
| | address(AREA) |
| | pop |
| | address(MAX) |
| BEST = LENS | move |
| | address(best) |
| | address(LENS) |
| END | |
| LENS += 1 | push_immediate |
| | 1 |
| | action_call |
| | address(add_to_LENS) |
| END | decrement_count |
| | jump_back |
| | 24 |
| LENS = BEST | push |
| | address(best) |
| | action_call |
| | address(set_LENS) |
| MIXED | procedure_call |
| | vocab#(MIXED) |
| | self_destruct |
| MIXED SUBROUTINE: | |
| REPEAT | |
| PROF | action_call |
| | address(PROF) |
| GO | action_call |
| | address(GO) |
| STOP | action_call |
| | address(STOP) |
| CENT | action_call |
| | address(CENT) |
| GO | action_call |
| | address(GO) |
| STOP | action_call |
| | address(STOP) |

TABLE 1-continued

| User's Source Code | Compiled Code |
|---|---|
| | jump_back |
| | 12 |
| | procedure_return |

What is claimed is:

1. A method of controlling an instrument which performs a cyclic process under control of a programmed computer, said computer including input means, comprising the steps of:

defining two tasks concurrently running in said computer: an operator task for running an instrument control program, and a compiler task for receiving and compiling instrument control programs;

defining a levels data structure for storing a reference to each instrument control program compiled by said compiler task, said levels data structure denoting the order in which said referenced programs were compiled;

performing, in said compiler task, the steps of:

receiving and compiling instrument control programs input by a user of said instrument via said input means;

denoting the existence of unexecuted, successfully compiled user input instrument control programs generated via said receiving and compiling step, including adding a reference to each successfully compiled instrument control program to said levels data structure;

performing, in said operator task, the steps of:

whenever a currently running instrument control program performs a jump back at the end of an instruction loop and said compiler task has denoted in said levels data structure the existence of at least one unexecuted, successfully compiled user input instrument control program, automatically suspending said currently running instrument control program and then automatically beginning execution of one of said unexecuted, successfully compiled user input instrument control programs;

resuming execution of the last suspended instrument control program when said currently running instrument control program finishes executing and there are no unexecuted, compiled user input instrument control programs denoted in said levels data structure by said compiler task deleting the reference to said currently running instrument control program from said levels data structure when said instrument control program is finished executing; and beginning execution of another successfully compiled user input instrument control program when said currently running instrument control program finishes executing and there is at least one more unexecuted, successfully compiled user input instrument control program denoted by said compiler task in said levels data structure.

2. The method of claim 1, further including performing, in said operator task, the steps of:

setting a predefined priority flag when said currently running instrument control program executes a predefined priority statement; and skipping said suspending step and continuing execution of said currently running instrument control process when said currently running instrument control program performs a jump back at the end of said instruction loop and said priority flag is set.

3. A method of controlling an instrument which performs a cyclic process under control of a programmed computer, said computer including input means, comprising the steps of:

defining two tasks concurrently running in said computer; an operator task for running an instrument control program, and a compiler task for receiving and compiling instrument control programs;

defining a kernel instrument control program that contains an unending instruction loop;

performing, in said compiler task, the steps of:

receiving and compiling instrument control programs input by a user of said instrument via said input means;

denoting the existence of unexecuted, successfully compiled user input instrument control programs generated via said receiving and compiling step;

performing, in said operator task, the steps of:

beginning execution of said kernel program when said instrument is turned on and when said instrument is reset;

whenever a currently running instrument control program performs a jump back at the end of an instruction loop and said compiler task has denoted the existence of at least one unexecuted, successfully compiled user input instrument control program, automatically suspending said currently running instrument control program and then automatically beginning execution of one of said unexecuted, successfully compiled user input instrument control programs;

resuming execution of the last suspended instrument control program when said currently running instrument control program finishes executing and there are no unexecuted, compiled user input instrument control programs denoted by said compiler task; and beginning execution of another successfully compiled user input instrument control program when said currently running instrument control program finishes executing and there is at least one more unexecuted, successfully compiled user input instrument control program denoted by said compiler task;

performing, in said compiler task, the step of setting a predefined abort flag if one of said instrument control programs received by said compiler task from a user of said instrument contains an abort statement; and performing, in said operator task, the step of testing said abort flag when initiating the execution of each said instrument control program, and, when said abort flag is set, ending execution of said currently running instrument control program, ending execution of all currently suspended instrument control programs except said kernel program, and resuming execution of said kernel program.

4. A method of controlling an instrument which performs a cyclic process under control of a programmed computer, said computer including input means, comprising the steps of:

defining two tasks concurrently running in said computer: an operator task for running an instrument control program, and a compiler task for receiving and compiling instrument control programs;

defining a kernel instrument control program that contains an unending instruction loop;

performing, in said compiler task, the steps of:
receiving and compiling instrument control programs input by a user of said instrument via said input means;
denoting the existence of unexecuted, successfully compiled user input instrument control programs generated via said receiving and compiling step;

performing, in said operator task, the steps of:
beginning execution of said kernel program when said instrument is turned on and when said instrument is reset;
whenever a currently running instrument control programs performs a jump back at the end of an instruction loop and said compiler task has denoted the existence of at least one unexecuted, successfully compiled user input instrument control program, automatically suspending said currently running instrument control program and then automatically beginning execution of one of said unexecuted, successfully compiled user input instrument control programs;
resuming execution of the last suspended instrument control program when said currently running instrument control program finishes executing and there are no unexecuted, compiled user input instrument control programs denoted by said compiler task; and
beginning execution of another successfully compiled user input instrument control program when said currently running instrument control program finishes executing and there is at least one more unexecuted, successfully compiled user input instrument control program denoted by said compiler task;

performing, in said compiler task, the step of setting a predefined cancel flag when one of said instrument control programs received by said compiler task from a user of said instrument contains a cancel statement; and performing, in said operator task, the step of testing said cancel flag prior to initiating the execution of each said instrument control program, when said cancel flag is set, ending execution of said currently running instrument control program and resuming execution of the last suspended instrument control program.

5. A method of controlling an instrument which performs a cyclic process under control of a programmed computer, comprising the steps of:
defining an operator task in said computer for running an instrument control program;
defining a compiler task in said computer, running as a separate task from said operator task, for receiving and compiling instrument control programs;
defining a levels data structure for storing a reference to each instrument control program compiled by said compiler task, said levels data structure denoting the order in which said referenced programs were compiled;
performing in said compiler task the step of adding a reference to each successfully compiled instrument control program to said levels data structure;
preforming in said operator task the steps of:
deleting the reference to an instrument control program from said levels data structure when said instrument control program is finished executing;
whenever a currently running instrument control program performs a jump back at the ned of an instruction loop and said levels data structure contains a reference to at least one instrument control program which was compiled more recently than said currently running instrument control program; (a) automatically suspending operation of said currently running instrument control program, and then automatically initiating execution of the least recently compiled instrument control program denoted in said levels data structure as being compiled after said currently running instrument control program; and otherwise (b) resuming execution of said currently running instrument control program at the beginning of said instruction loop.

6. The method of claim 5, wherein the steps performed in said operator task include the steps of:
when said currently running instrument control program finishes executing and said levels data structure contains a reference to at least one instrument control program which was compiled more recently than said currently running instrument control program, initiating execution of the least recently compiled instrument control program denoted in said levels data structure as being compiled after said currently running instrument control program; and otherwise resuming execution of the last suspended instrument control program.

7. The method of claim 6, wherein
the steps performed in said operator task include the steps of
setting a predefined priority flag when said currently running instrument control program executes a predefined priority statement; and
when said currently running instrument control program performs a jump back at the end of an instruction loop, if said priority flag is set, resuming execution of said currently running instrument control program at the beginning of said instruction loop.

8. A method of controlling an instrument which performs a cyclic process under control of a programmed computer, comprising the steps of:
defining an operator task in said computer for running an instrument control program;
defining a compiler task in said computer, running as a separate task from said operator task, for receiving and compiling instrument control programs;
defining a levels data structure for storing a reference to each instrument control program compiled by said compiler task, said levels data structure denoting the order in which said referenced programs were compiled;
defining a kernel instrument control program that contains an instruction loop and is permanently referenced in said levels data structure;
performing in said compiler task the step of adding a reference to each successfully compiled instrument control program to said levels data structure;
preforming in said operator task the steps of:
deleting the reference to an instrument control program from said levels data structure when said instrument control program is finished executing;

whenever a currently running instrument control program performs a jump back at the end of an instruction loop and said levels data structure contains a reference to at least one instrument control program which was compiled more recently than said currently running instrument control program; (a) automatically suspending operation of said currently running instrument control program, and then automatically initiating execution of the least recently compiled instrument control program denoted in said levels data structure as being compiled after said currently running instrument control program; and otherwise (b) resuming execution of said currently running instrument control program at the beginning of said instruction loop;

when said currently running instrument control program finishes executing and said levels data structure contains a reference to at least one instrument control program which was compiled more recently than said instrument control program, initiating execution of the least recently compiled instrument control program denoted in said levels data structure as being compiled after said currently running instrument control program; and otherwise resuming execution of the least suspended instrument control program;

wherein the steps performed in said compiler task includes setting a predefined abort flag when one of said instrument control programs received by said compiler task from a user of said instrument contains an abort statement;

the steps performed in said operator task include testing said abort flag when initialing the execution of each said instrument control program, and, if said abort flag is set, (a) resetting said abort flag, (b) deleting all program references from said levels data structure except the reference to said kernel program, and (c) resuming execution of said kernel program.

9. A method of controlling an instrument which performs a cyclic process under control of a programmed computer, comprising the steps of:

defining an operator task in said computer for running an instrument control program;

defining a compiler task in said computer, running as a separate task from said operator task, for receiving and compiling instrument control programs;

defining a levels data structure for storing a reference to each instrument control program compiled by said compiler task, said levels data structure denoting the order in which said referenced programs were compiled;

defining a kernel instrument control program that contains an instruction loop and is permanently referenced in said levels data structure;

performing in said compiler takes the step of adding a reference to each successfully compiled instrument control program to said levels data structure;

preforming in said operator task the steps of:

deleting the reference to an instrument control program from said levels data structure when said instrument control program is finished executing;

whenever a currently running instrument control program performs a jump back at the end of an instruction loop and said levels data structure contains a reference to at least one instrument control program which was compiled more recently than said currently running instrument control program: (a) automatically suspending operation of said currently running instrument control program, and then automatically initiating execution of the least recently compiled instrument control program denoted in said levels data structure as being compiled after said currently running instrument control program; and otherwise (b) resuming execution of said currently running instrument control program at the beginning of said instruction loop;

when said currently running instrument control program finishes executing and said levels data structure contains a reference to at least one instrument control program which was compiled more recently than said currently running instrument control program, initiating execution of the least recently compiled instrument control program denoted in said levels data structure as being compiled after said currently running instrument control program; and otherwise resuming execution of the last suspended instrument control program;

wherein said compiler task is programmed to set a predefined cancel flag if one of said instrument control programs received by said compiler task from a user of said instrument contains a cancel statement;

said operator task is programmed to test said cancel flag prior to initiating the execution of each said instrument control program, and, if said cancel flag is set, to (a) reset said cancel flag, (b) delete all program references from said levels data structure to said currently running instrument control program, unless said currently running instrument control program is said kernel program, and to program more recently compiled, and (c) resume execution of the most recently compiled program denoted by said levels data structure.

10. Apparatus for controlling an instrument which performs a specified cyclic process comprising:

computer means coupled to said instrument including processing means for executing predefined programs;

interface means for sending control signals generated by said processing means to said instrument;

an operator task for running an instrument control program in said processing means;

input means for receiving input from a user of said instrument;

a compiler task, running concurrently in said processing means as a separate task from said operator task, for receiving and compiling instrument control programs including new instrument control programs input by a user of said instrument via said input means, a levels data structure for storing a reference to each instrument control program compiled by said compiler task, said levels data structure denoting the existence of unexecuted, successfully compiled user input instrument control programs, and the order in which said instrument control programs were compiled;

said operator task including means for:

whenever a currently running instrument control program performs a jump back at the end of an instruction loop and said compiler task has denoted in said levels data structure the existence of at least one unexecuted, successfully compiled user input instrument control program, automatically suspending said currently running instrument control program and then automatically beginning execution of one of said unexecuted, successfully compiled user input instrument control programs;

resuming execution of the last suspended instrument control program when said currently running instrument control program finishes executing and there are no unexecuted, compiled user input instrument control programs denoted in said levels data structure by said compiler task;

deleting the reference to said currently running instrument control program from said levels data structure when said currently running instrument control program is finished executing; and beginning execution of another successfully compiled user input instrument control program when said currently running instrument control program finishes executing and there is at least one more unexecuted, successfully compiled user input instrument control program denoted in said levels data structure by said compiler task.

11. Apparatus for controlling an instrument which performs a specified cyclic process, comprising:

computer means coupled to said instrument including computer means for executing predefined programs;

interface means for sending control signals generated by said processing means to said instrument;

an operator task for running an instrument control program in said processing means;

a compiler task, running in said processing means as a separate task from said operator task, for receiving and compiling instrument control programs; and a levels data structure for storing a reference to each instrument control program compiled by said compiler task, said levels data structure denoting the order in which said reference programs were compiled;

said compiler task including means for adding a reference to each successfully compiled instrument control program to said levels data structure;

said operator task including means for:

deleting the reference to an instrument control program from said levels data structure when said instrument control program is finished executing;

whenever a currently running instrument control program performs a jump back at the end of an instruction loop, if said levels data structure contains a reference to at least one instrument control program which was compiled more recently than said currently running instrument control program:
(a) automatically suspending operation of said currently running instrument control program, and then automatically initiating execution of the least recently compiled instrument control program denoted in said levels data structure as being compiled after said currently running instrument control program; and otherwise (b) resuming execution of said currently running instrument control program at the beginning of said instruction loop.

12. Apparatus for controlling an instrument, as set forth in claim 11, said operator task further including means for:

initiating execution of the least recently compiled instrument control program denoted in said levels data structure as being compiled after said currently running instrument control program, when said currently running instrument control program finishes executing and said levels data structure contains a reference to at least one instrument control program which was compiled more recently than said currently running instrument control program; and resuming execution of the most recently compiled program referenced by said levels data structure when said currently running instrument control program finishes executing and said levels data structure contains no references to instrument control programs more recently compiled than said currently running instrument control program.

13. Apparatus for controlling an instrument, as set forth in claim 11, said operator task further including means for:

setting a predefined priority flag when said currently running instrument control program executes a predefined priority statement; and overriding said means for suspending the operation of said currently running instrument control program, and continuing execution of said currently running instrument control program when said currently running instrument control program performs a jump back at the end of said instruction loop and said priority flag is set.

14. Apparatus for controlling an instrument which performs a specified cyclic process, comprising:

computer means coupled to said instrument including processing means for executing predefined programs;

interface means for sending control signals generated by said processing means to said instrument;

an operator task for running an instrument control program in said processing means;

input means for receiving input from a user of said instrument;

a levels data structure for storing a reference to each instrument control program compiled by said compiler task, said levels data structure denoting the order in which said referenced programs were compiled;

a compiler task, running concurrently in said processing means as a separate task from said operator task, for receiving and compiling instrument control programs including new instrument control programs input by a user of said instrument via said input means, including means denoting in said levels data structure the existence of unexecuted, successfully compiled user input instrument control programs, and the order in which said instrument control programs were compiled; and a kernel instrument control program that contains an instruction loop and is permanently referenced in said levels data structure;

said operator task including means for:

whenever a currently running instrument control program performs a jump back at the nd of an instruction loop and said compiler task has denoted in said levels data structure the existence of at least one unexecuted, successfully compiled user input instrument control program, automatically suspending said currently running instrument control program and then automatically beginning execution of one of said unexecuted, successfully compiled user input instrument control programs;

resuming execution of the last suspended instrument control program when said currently running instrument control program finishes executing and there are no unexecuted, compiled user input instrument control programs denoted in said levels data structure by said compiler task; and beginning execution of another successfully compiled user input instrument control program when said currently running instrument control program finishes executing and there is at least one more unexecuted, successfully compiled user input instrument control program denoted in said levels data structure by said compiler task;

wherein said compiler task includes means for setting a predefined cancel flag when one of said instrument control programs received by said compiler task from a user of said instrument contains a cancel statement;

said operator task includes means for testing said cancel flag prior to initiating execution of each said instrument control program, and, when said cancel flag is set, (a) resetting said cancel flag, (b) deleting all program references from said levels data structure to said currently running instrument control program, unless said instrument currently running program is said kernel program, and to programs more recently compiled, and (c) resuming execution of the most recently compiled program denoted in said levels data structure.

15. Apparatus for controlling an instrument which performs a specified cyclic process, comprising:

computer means coupled to said instrument including processing means for executing predefined programs;

interface means for sending control signals generated by said processing means to said instrument;

an operator task for running an instrument control program in said processing means;

input means for receiving input from a user of said instrument;

a compiler task, running concurrently in said processing means as a separate task from said operator task, for receiving and compiling instrument control programs including new instrument control programs input by a user of said instrument via said input means, including means denoting the existence of unexecuted, successfully compiled user input instrument control programs, and the order in which said instrument control programs were compiled; and a kernel instrument control program that contains an unending instruction loop;

said operator task including means for:

whenever a currently running instrument control program performs a jump back at the end of an instruction loop and said compiler task has denoted the existence of at least one unexecuted, successfully compiled user input instrument control program, automatically suspending said currently running instrument control program and then automatically beginning execution of one of said unexecuted, successfully compiled user input instrument control programs;

resuming execution of the last suspended instrument control program when said currently running instrument control program finishes executing and there are no unexecuted, compiled user input instrument control programs denoted by said compiler task; and beginning execution of another successfully compiled user input instrument control program when said currently running instrument control program finishes executing and there is at least one more unexecuted, successfully compiled user input instrument control program denoted by said compiler task;

said compiler task further including means for setting a predefined cancel flag when one of said instrument control programs received by said compiler task from the user of said instrument contains a cancel statement;

said operator task further including means for:

beginning execution of said kernel program in said operator task when said instrument is turned on and when said instrument is reset;

testing said cancel flag prior to initiating the execution of each said instrument control program, and when said cancel flag is set, ending execution of said currently running instrument control program and resuming execution of the last suspended instrument control program.

16. Apparatus for controlling an instrument which performs a specified cyclic process, comprising:

computer means coupled to said instrument including processing means for executing predefined programs;

interface means for sending control signals generated by said processing means to said instrument;

an operator task for running an instrument control program in said processing means;

a user input task, running concurrently in said processing means as a separate task from said operator task, which receives instrument control programs specified by a user of said instrument; and a levels data structure for storing references to instrument control programs, said levels data structure denoting the order in which said instrument programs are received from a user of said instrument;

wherein said user input task includes means for adding a reference to each received instrument control program to said levels data structure;

said operator task including means for:

deleting the reference to an instrument control program from said levels data structure when said instrument control program is finished executing;

whenever a currently running instrument control program performs a jump back at the end of an instruction loop, if said levels data structure contains a reference to at least one instrument control program more recently received than said currently running instrument control program: (a) automatically suspending operation of said currently running instrument control program, and then automatically initiating execution of the instrument control program denoted in said levels data structure as being the least recently received after said currently running instrument control program; and otherwise (b) resuming execution of said currently running instrument control program at the beginning of said instruction loop.

17. Apparatus for controlling an instrument, as set forth in claim 16, said operator task further including means for:

initiating execution of the least recently received instrument control program denoted in said levels data structure as being received after said currently running instrument control program, when said currently running instrument control program finishes executing and said levels data structure contains a reference to at least one instrument control program which was more recently received than said currently running instrument control program; and resuming execution of the most recently received program referenced by said levels data structure when said currently running instrument control program finishes executing and said levels data structure contains no references to instrument control programs more recently received than said currently running instrument control program.

18. Apparatus for controlling an instrument, as set forth in claim 16, said operator task further including means for:

setting a predefined priority flag when said currently running instrument control program executes a predefined priority statement; and overriding said means for suspending the operation of said currently running instrument control program, and continuing execution of said currently running instrument control program when said currently running instrument control program performs a jump back at the end of said instruction loop and said priority flag is set.

19. Apparatus for controlling an instrument which performs a specified cyclic process, comprising:

computer means coupled to said instrument including
processing means for executing predefined programs;
interface means for sending control signals generated by said processing means to said instrument;
an operator task for running an instrument control program in said processing means;
a user input task, running concurrently in said processing means as a separate task from said operator task, which receives instrument control programs specified by a user of said instrument;
an operator task for running an instrument control program in said processing means;
a user input task, running concurrently in said processing means as a separate task from said operator task, which receives instrument control programs specified by a user of said instrument;
a levels data structure for storing references to instrument control programs, said levels data structure denoting the order in which said instrument control programs are received from a user of said instrument, and
a kernel instrument control program that contains an instruction loop and is permanently referenced in said levels data structure;
wherein said user input task includes means for adding a reference to each received instrument control program to said levels data structure;
said operator task including means for:
deleting the reference to an instrument control program from said levels data structure when said instrument control program is finished executing;
whenever a currently running instrument control program performs a jump back at the end of an instruction loop, if said levels data structure contains a reference to at least one instrument control program more recently received than said currently running instrument control program: (a) automatically suspending operation of said currently running instrument control program, and then automatically initiating execution of the instrument control program denoted in said levels data structure as being the least recently received after said currently running instrument control program; and otherwise (b) resuming execution of said currently running instrument control program at the beginning of said instruction loop;
wherein
said user input task includes means for setting a predefined cancel flag when one of said instrument control programs received by said user input task contains a cancel statement;
said operator task includes means for testing said cancel flag prior to initiating execution of each said instrument control program, and, when said cancel flag is set, (a) resetting said cancel flag, (b) deleting all program references from said levels data structure to said currently running instrument control program, unless said instrument currently running control program is said kernel program, and to programs more recently received than said instrument currently running control program, and (c) resuming execution of the most recently received program denoted by levels data structure.

* * * * *